United States Patent [19]

Okumoto

[11] Patent Number: 5,210,390
[45] Date of Patent: May 11, 1993

[54] APPARATUS FOR BORING PERFORATIONS IN A WEB SHEET

[75] Inventor: Yutaka Okumoto, Tokyo, Japan

[73] Assignee: Japan Tobacco Inc., Machine-Technology, Tokyo, Japan

[21] Appl. No.: 845,041

[22] Filed: Mar. 3, 1992

[30] Foreign Application Priority Data

Mar. 6, 1991 [JP] Japan ................................... 3-40191

[51] Int. Cl.$^5$ ............................................. B23K 26/00
[52] U.S. Cl. .................................. 219/121.7; 131/281; 219/121.77
[58] Field of Search ........... 219/121.7, 121.71, 121.77; 131/281

[56] References Cited

U.S. PATENT DOCUMENTS 4,916,272  4/1990  Okumoto ........................ 219/121.7

FOREIGN PATENT DOCUMENTS 57-26872  6/1982  Japan .
57-37437  8/1982  Japan .
57-49318  10/1982  Japan .
59-318  1/1984  Japan .
59-21380  2/1984  Japan .

*Primary Examiner*—C. L. Albritton

[57] ABSTRACT

A continuously emitted convergent laser beam is deflected by means of a rotating polygon mirror, to be directed to a reflector mirror having a pair of reflective surfaces, which adjoin each other at the vertex portion thereof. As the reflective surfaces of the reflector mirror are scanned with the laser beam, the beam is split and alternately directed to one mirror pair and the other mirror pair. The laser beam directed to each mirror pair is further divided into segment beams, which are reflected in opposite directions and condensed on a tipping paper sheet by means of condensing lenses. Thus, two alternate pairs of rows of perforations, four rows in total, are bored through the sheet.

5 Claims, 4 Drawing Sheets

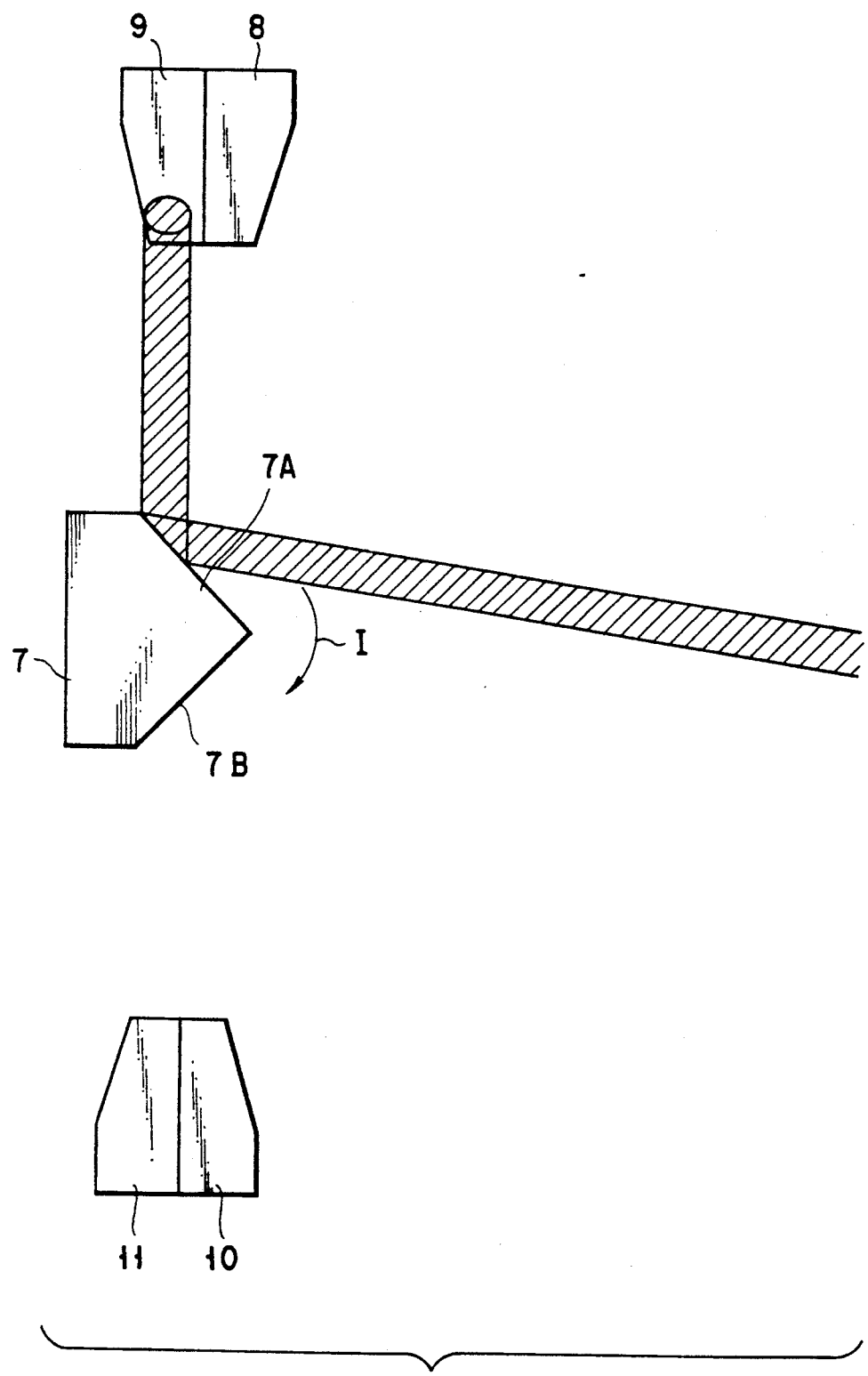
F I G. 3

APPARATUS FOR BORING PERFORATIONS IN A WEB SHEET

BACKGROUND OF THE INVENTION

1. Field of the Invention

The present invention relates to a boring apparatus for boring perforations in rolled paper or a web sheet, such as a tipping paper sheet, and more particularly, to a boring apparatus capable of boring perforations of a uniform shape in a web sheet at high speed.

2. Description of the Related Art

In a conventional boring apparatus, a pulse laser beam is used to form a number of perforations with a uniform shape and accurate pattern in rolled paper or a web sheet, such as tipping paper sheet. Conventional methods for converting a laser beam into pulses include a pulse beam oscillation method (1), slit method (2), chopper method (3), and shutter method or beam scanning method (4).

In the pulse beam oscillation method (1), a carbon dioxide gas laser, which generates a pulsating laser beam, is usually employed as a laser beam source. The carbon dioxide gas laser is selected because it generates the pulsating laser beam with great power, and the generated laser beam has a wavelength of 10 $\mu$, the optimum wavelength for the absorption of water in a web sheet, e.g., tipping paper sheet. In the existing circumstances, it is believed that this gas laser, among other lasers developed so far, is best suited for boring perforations in paper. In the carbon dioxide gas laser, however, the first and last transitions of the laser beam require several hundreds of microseconds each, and a laser beam pulse train cannot be generated in a short enough period. In a boring apparatus using the carbon dioxide gas laser as its light source, therefore, the perforations cannot not be formed at high speed in an unlimited manner, that is, the boring speed cannot be increased. More specifically, the maximum speed for 1-mm pitch boring is only 2 mm/sec, so that the boring efficiency is not very high.

In the slit method (2), a slit member having a row of slits formed therein, along with a paper sheet to be perforated, is run on a boring plane in a manner such that a continuously emitted laser beam is condensed on the boring plane by means of a lens system, whereby the laser beam is intermittently condensed on the sheet through the slits. Thus, perforations are intermittently formed in the sheet corresponding to the row of slits. According to this slit method, in contrast with the pulse beam oscillation method, the laser beam is continuously oscillated. It is believed, therefore, that the perforations can be bored through the sheet at higher speed than in the case of the pulse beam oscillation method, without any restrictions on the boring speed associated with the first and last transitions of the laser beam, and the cost of boring operation can be reduced According to a specific example of the slit method, the sheet can be perforated at the boring speed of 6 mm/sec. This slit method, however, is subject to the following problems.

(a) Since the slits of the slit member, which are subject to variation in size, are transferred directly to the sheet, the size and pitch of the perforations vary depending on the working accuracy of the slits. In general, the slit method compares unfavorably with the pulse beam oscillation method in the variation in perforation size and pitch.

(b) The slits are situated close to the substantial focal point of the lens system, and the condensed laser beam is continually applied to the slit member. In some cases, therefore, the slit member may be damaged by the condensed laser beam. If the slit member is damaged, the individual slits are changed in size, so that the irregularity of the perforations is enlarged.

(c) In boring the perforations, the paper sheet is burnt by the laser energy. The resulting ashes of the sheet may possibly adhere to the slits, thereby hindering the passage of the condensed laser beam. As a result, the perforations are subject to greater variation in size.

In the chopper method (3), a continuously emitted laser beam is directed to a rotating chopper disk, and is chopped and divided into segment laser beams by means of the disk. As these segment beams are successively condensed on a paper sheet, perforations are intermittently formed in the sheet at regular intervals. Although the problems peculiar to the pulse beam oscillation method and the slit method can be solved, according to this chopper method, the chopper disk is expected to rotate at high speed, and may possibly be broken by centrifugal force produced by the rotation. More specifically, if the diameter of the chopper disk and the number chops are 30 cm and 20, respectively, only 20,000 perforations can be formed with every minute when the disk is rotated at the speed of 1,000 rpm. When the rotating speed of the disk is 60,000 rpm, on contrast with this, 1,200,000 perforations can be formed with every minute. If the chopper disk is rotated at the speed of 60,000 rpm, however, there is a high possibility of its being broken.

In the pulse beam oscillation method (1) described above, the laser beam is intermittently oscillated, so that the laser source itself cannot efficiently generate the laser beam. In the slit method (2) and the chopper method (3), the power of the emitted laser beam is not effectively utilized. More specifically, according to the slit and chopper methods, the laser beam is intercepted by the slit member or chopper disk for that region of the paper sheet which should not be perforated, so that the laser beam emitted from the laser is not used well.

In the shutter method (4), as is disclosed in Published Examined Japanese Patent Application Nos. 57-37437, 57-49318 and 59-318, a continuously emitted laser beam is directed to a plurality of rotating disks, which have a plurality of sets of reflective surfaces and openings each. As the laser beam is reflected by the reflective surfaces and transmitted through the openings, it is divided into segment pulses and condensed on a paper sheet to be perforated. According to this shutter method, a plurality of rows of perforations are formed simultaneously, so that the laser power can be effectively utilized for high-efficiency boring. In this case, however, it is necessary to use the rotating disks as many as the rows of perforations. For high-speed boring operation, moreover, these disks are expected to be manufactured with a very high working accuracy. If the working accuracy is low, the rotation of the rotating disks is ill balanced, so that the perforation accuracy may be lowered, and in the worst case, the apparatus itself may be destroyed. Since the plurality of sets of reflective surfaces and openings must be arranged on the rotating disks, furthermore, each disk usually should have a large diameter. Also for this reason, the working accuracy of the rotating disks may be lowered, thereby entailing lower perforation accuracy or breakdown of the apparatus.

The conventional boring apparatus, using any of the methods described above, is subject to problems such that high-speed boring operation is difficult, the perforations vary in size and are low in accuracy, and/or the laser power cannot be effectively utilized. When rotating disks with low working accuracy are used to perform high-speed boring operation, moreover, the apparatus itself may be damaged.

SUMMARY OF THE INVENTION

The present invention has been contrived in consideration of these circumstances, and its object is to provide a boring apparatus capable of rapidly boring perforations in a web sheet with high stability and accuracy.

According to the present invention, there is provided a boring apparatus for boring perforations in a web sheet, which comprises: generator means for continuously emitting a laser beam; first converging means for converging the laser beam; deflecting means for deflecting the convergent laser beam; splitting/reflecting means adapted to be scanned with the deflected laser beam from the deflecting means and to reflect the laser beam in a manner such that the laser beam is split into two laser beams as the splitting/reflecting means is scanned; first and second separating means for separating each of the two laser beams from the splitting/reflecting means into two segment beams and directing the segment beams in opposite direction; and second, third, fourth, and fifth condensing means for condensing the segment beams from the first and second separating mean on the web sheet.

Preferably, according to an aspect of the invention, separating mirrors of the separating means each have a trapezoidal reflective surface and are movable along the reflective surface.

In the boring apparatus for a web sheet according to the invention, the laser beam is continuously emitted, so that the sheet is bored with stable power, and therefore, uniform perforations can be formed in the sheet. Further, the laser beam is split by means of the combination of a rotating polygon mirror, for use as the deflecting means, and reflector mirrors, for use as the splitting/reflecting means, and all the energy is utilized for boring, so that the energy utilization factor of the apparatus is high. Since a plurality of rows of perforations are bored simultaneously, moreover, the boring efficiency can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate trade a presently preferred embodiment of the invention and, together with the general description given above and the detailed description of the preferred embodiment given below, serve to explain the principles of the invention.

FIG. 3 is a plan view schematically showing an optical system of the boring apparatus of FIG. 1, extending from a second reflector mirror to third and fourth reflector mirrors;

DESCRIPTION OF THE PREFERRED EMBODIMENTS

A boring apparatus according to an embodiment of the present invention will now be described with reference to the accompanying drawings.

Figure 1:
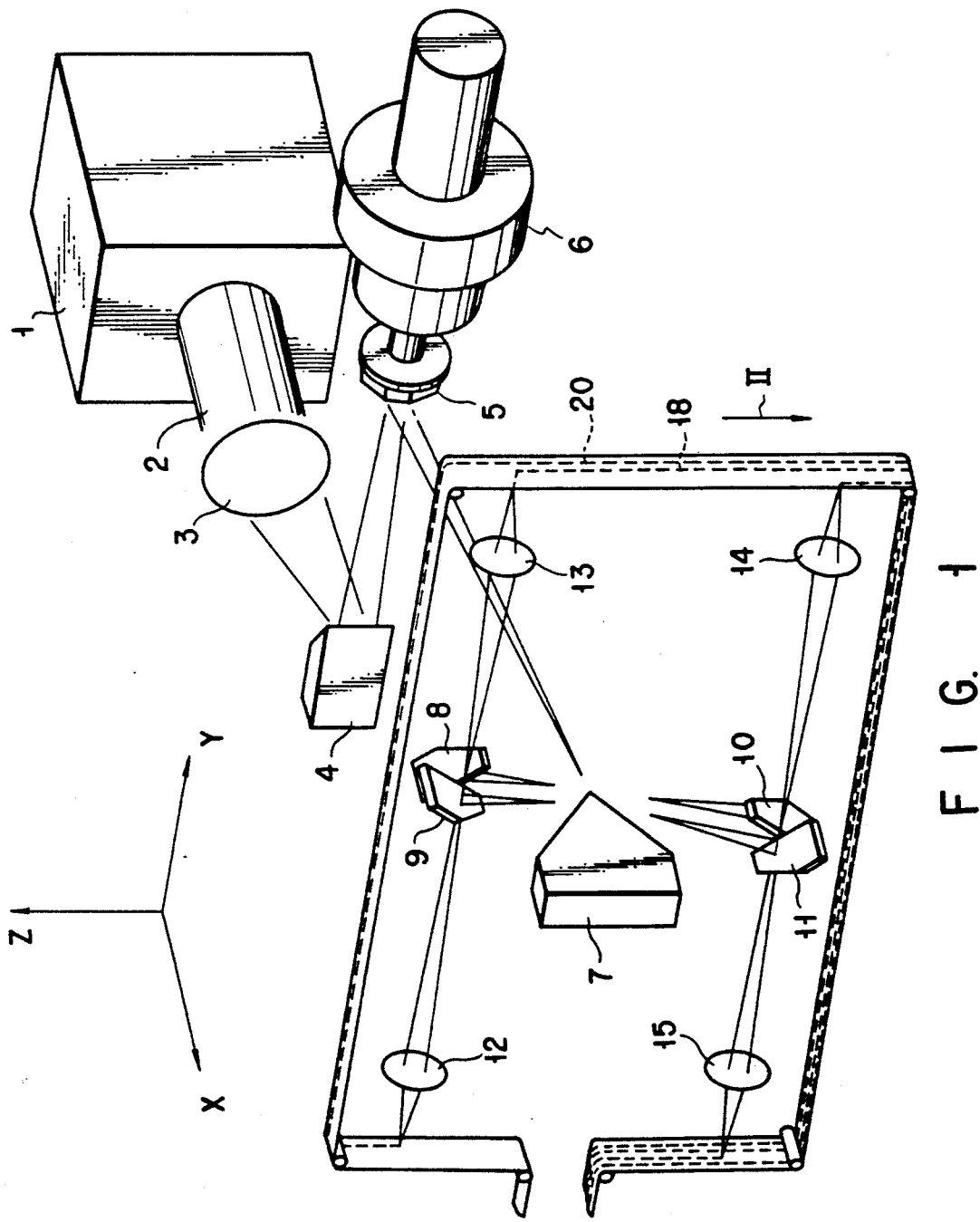
FIG. 1 is a schematic view showing a boring apparatus according to an embodiment of the present invention.
Figure 2A:
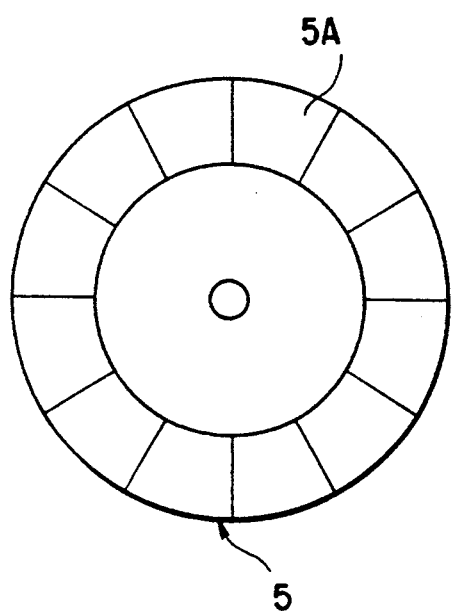
FIG. 2 is a plan view and FIG. 2B a side view respectively, showing a rotating polygon mirror incorporated in the boring apparatus shown in FIG. 1.
Figure 2B:
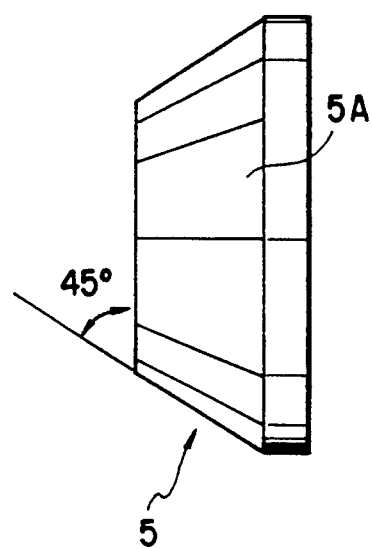

As shown in FIG. 1, a laser beam 2 is continuously emitted in the X direction from a laser source 1, and is converged by means of a condensing lens 3. This convergent laser beam is turned for 90° in the Y direction by means of a first mirror 4, and is landed on a polygon mirror 5. As shown in FIGS. 2A and 2B, the polygon mirror 5 is in the form of a truncated cone, and a predetermined number of reflective surfaces 5A, which are inclined at about 45°, are arranged around the mirror 5. As shown in FIG. 1, the mirror 5 is mounted on a spindle 6, which is rotated at high speed. As the polygon mirror 5 rotates, the laser beam reflected by the mirror 5 is deflected toward a second reflector mirror 7. The angle or range of deflection of the laser beam deflected by means of the polygon mirror 5 depends on the number of the reflective surfaces of the mirror 5.

The second reflector mirror 7 is supported for fine adjustment in the Z direction, and is substantially in the form of a triangular prism whose vertex portion is directed to the polygon mirror 5, as shown in FIG. 1. A pair of surfaces which meet at the vertex of prism-shaped portion are defined individually as reflective surfaces 7A and 7B of the mirror 7. The deflected laser beam is used to scan the pair of reflective surfaces 7A and 7B in succession, as indicated by arrow I in FIG. 3. As the surfaces 7A and 7B are scanned in this manner, the laser beam is split into first and second laser beams, which are reflected on third and fourth mirror pairs 8, 9, 10 and 11, respectively. Thus, while the reflective surface 7A of the reflector mirror 7 is being scanned with the laser beam the beam is directed to the third mirror pair 8 and 9. When the laser beam passes the vertex of the mirror 7 and reaches the reflective surface 7B, it is directed to the fourth mirror pair 10 and 11. While the reflective surface 7B of the reflector mirror 7 is being scanned with the laser beam, the beam continues to be directed to the fourth mirror pair 10 and 11. As the laser beam is repeatedly deflected, it is alternately distributed to the third and fourth mirror pairs 8, 9, 10 and 11.

The first laser beam, directed to the third mirror pair 8 and 9, is divided into first and second segment beams by the mirror pair 8 and 9, and these segment beams are reflected in opposite directions. The first and second segment beams are condensed, by means of condensing lenses 12 and 13, on a sheet 18 which travels in the direction of arrow II around the optical system including the elements 7, 8, 9, 10, 11, 12 and 13. Those portions of the sheet 18 which face the condensing or focusing lenses 12 and 13 are bound to pass the respective focal planes of the lenses 12 and 13. Thus, the first and second segment beams condensed by means of the condensing lenses 12 and 13 individually form the smallest beam spots on those regions of the sheet 18 which face the lenses 12 and 13, thereby boring perforations 20 in the sheet 18. Likewise, the second laser beam, directed to the fourth mirror pair 10 and 11, is divided into third and fourth segment beams by the mirror pair 10 and 11, and these segment beams are reflected in opposite directions. The third and fourth segment beams are condensed, by means of condensing lenses 14 and 15, on the sheet 18 which travels around the optical system including the elements 7, 8, 9, 10, 11, 12, 13, 14 and 15. Those portions of the sheet 18 which face the condensing or focusing lenses 14 and 15 are bound to pass the respective focal planes of the lenses 14 and 15. Thus, the third and fourth segment beams condensed by means of the condensing lenses 14 and 15 individually form the smallest beam spots on those regions of the sheet 18 which face the lenses 14 and 15, thereby boring the perforations 20 in the sheet 18.

The individual condensing lenses 12, 13, 14 and 15 are directed to the sheet 18 so that their respective focal points are situated on different coordinate points with respect the transverse direction of the sheet. Thus, a first row of perforations 20 is formed by the first segment beam which is condensed by means of the condensing lens 12. Likewise, second, third, and fourth rows of perforations 20 are formed parallel to one another in the sheet 18 by the second, third, and fourth segment beams which are condensed by means of the condensing lenses 13, 14 and 15, respectively.

Figure 4:
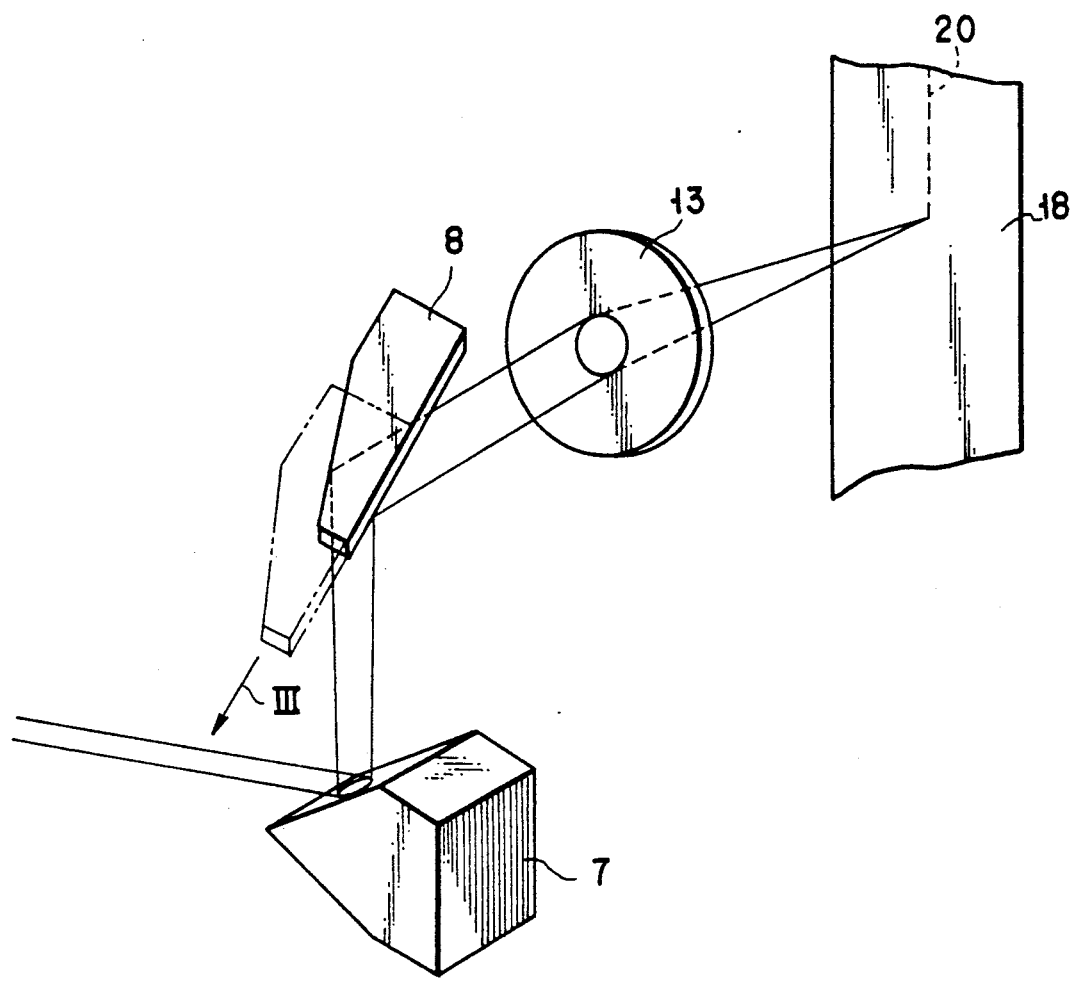
FIG. 4 is a perspective view schematically showing an optical system of the boring apparatus of FIG. 1, extending from the second reflector mirror to a tipping paper sheet.
Figure 5:
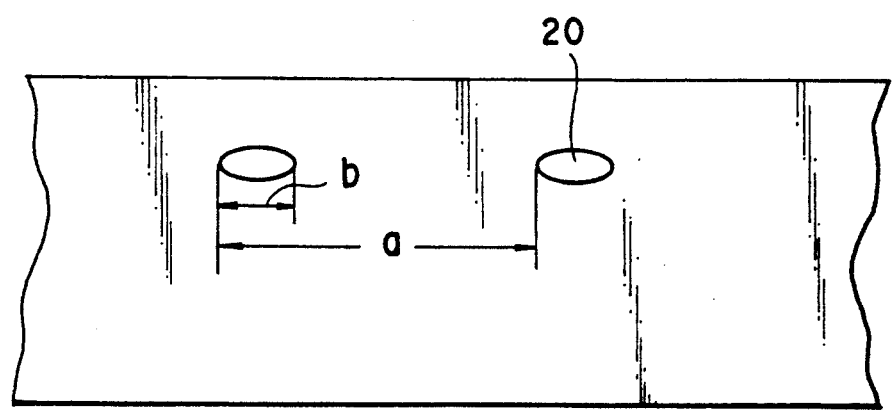
FIG. 5 illustrates the relationship between the length and pitch of perforations formed in the sheet.

The reflective surface of each mirror of the third and fourth mirror pairs 8, 9, 10 and 11 has a substantially trapezoidal plane shape, and is movable within a fine range along its plane. More specifically, as shown in FIG. 4, the mirror 8 is arranged so as to be finely movable in the direction of arrow III along one side of the trapezoid. An opening ratio b/a shown in FIG. 5, i.e., the ratio of the length b of each perforation 20 to the pitch a of the perforations, can be changed by moving the mirror 8 in the direction of arrow III. More specifically, when the mirror 8 is moved in the direction of arrow III, the width of its region to reflect the laser beam is changed. In the case where the maximum-width region of the mirror 8 is scanned with the laser beam applied thereto, for example, the laser beam is reflected by this region and condensed on the sheet 18 by means of the condensing lens 13, thereby forming the perforation 20 having the maximum opening length b, while the maximum-width region is being scanned. When the mirror 8 is moved, in contrast with this, the laser beam reflected by the second mirror 7 is applied to a region of the mirror 8 which is narrower than the maximum-width region, so that this narrower region is scanned. During a period shorter than the period for scanning the maximum-width region, therefore, the laser beam is reflected by the mirror 8 and directed to the condensing lens 13. As a result, the perforations are formed having the opening length b corresponding to the width of the region of the mirror 8 to which the laser beam is applied. Since the opening length b is thus variable, the opening ratio b/a can be changed.

EXAMPLE

A carbon dioxide gas laser capable of continuously emitting a laser beam is used as the laser source 1, and the laser beam with the beam diameter of 13 mm is emitted from this laser. This laser beam is condensed on the reflective surface of the polygon mirror 5 to form a beam spot with the diameter of about 1 mm to 2 mm thereon, by means of the condensing lens 3 having the focal length of 254 mm. Usually, a laser beam with the beam diameter of 10 mm to 15 mm is emitted from a laser source. In the case where the laser beam with the beam diameter of 1 mm to 2 mm can be emitted from the laser source 1, however, the condensing lens 3 need not be used. The polygon mirror 5 has the diameter of 50 mm, and its outer peripheral surface has a trisoctahedral shape. Each face of the mirror 5 constitutes the reflective surface 5A measuring 6 mm by 6 mm. The polygon mirror 5 is rotated at 70,000 rpm by means of the high-speed spindle 6. If the mirror 5 has the diameter of about 30 cm, the reflective surfaces of the mirror 5 can be made wide enough to allow the laser beam with the beam diameter of 10 mm to 15 mm to be landed directly on the mirror 5 without passing through the condensing lens 3. In this case, however, the polygon mirror 5 cannot be rotated at high speed. This is because the mirror 5 may possibly be broken by centrifugal force produced by the rotation if the mirror 5 having the large diameter of about 30 cm is rotated at the speed as high as 70,000 rpm. Preferably, the diameter of the laser beam incident on the polygon mirror 5 ranges from $\frac{1}{8}$ to $\frac{1}{4}$ or less of the length of each side of each reflective surface. This range is determined in order to minimize the wasteful period of time during which the laser beam is simultaneously applied to one reflective surface of the rotating polygon mirror 5 and one of its adjacent reflective surfaces. In the case of tipping paper sheet for cigarette filters, moreover, the opening ratio b/a is preferably adjusted to about $\frac{1}{4}$.

COMPARATIVE EXAMPLE

In boring four rows of perforations at the pitch of 0.5 mm, the rotating section of the conventional boring apparatus requires 40 sets of mirrors, while that of the boring apparatus of the present invention can produce the following results despite the use of the only 24 reflector mirrors. Thus, the boring apparatus of the invention can perform high-speed boring operation.

| Rotating Speed (rpm) | Boring Speed (m/min) | |
|---|---|---|
| | Prior Art | Invention |
| 5,000 | 5 × 40 × 0.5 = 100 | 5 × 24 × 0.5 = 60 |
| 10,000 | 200 | 120 |
| 20,000 | 400 | 240 |
| 30,000 | / | 360 |
| 50,000 | / | 600 |
| 70,000 | / | 840 |

Since the boring apparatus of the present invention, as described above, uses the continuously emitted laser beam, its power is stabilized, so that variations in size and shape of the bored perforations can be reduced. The laser beam is divided by means of the combination of the rotating polygon mirror and the reflector mirrors, and all the energy is utilized for boring, so that the energy utilization factor of the apparatus is high. Since a plurality of rows of perforations are bored simultaneously, moreover, the boring efficiency can be improved.

The rotating section includes the high-speed spindle and the polygon mirror mounted thereon, and the polygon mirror is composed mainly of the reflective surfaces. Therefore, the rotating section has a simple construction, and can be manufactured relatively easily. Moreover, the boring speed can be increased by speeding up the rotation of the rotating section.

Since the individual mirrors of the third and fourth mirror pairs, which are substantially trapezoidal in shape, are rockable over a fine range, so that the beam diameter of the condensed laser beam can be changed relatively easily. Thus, the opening ratio of the perforations formed by boring can be changed with ease.

Additional advantages and modifications will readily occur to those skilled in the art. Therefore, the invention in its broader aspects is not limited to the specific details, and representative devices shown and described herein. Accordingly various modifications may be made without departing from the spirit or scope of the general inventive concept as defined by the appended claims and their equivalents.

What is claimed is:

1. A boring apparatus for boring perforations in a web sheet, comprising:
    generator means for continuously emitting a laser beam;
    first converging means for converging the laser beam;
    deflecting means for deflecting the convergent laser beam;
    splitting/reflecting means adapted to be scanned with the deflected laser beam from the deflecting means and to reflect the laser beam in a manner such that the laser beam is split into two laser beams as the splitting/reflecting means is scanned;
    first and second separating means for separating each of the two laser beams from the splitting/reflecting means into two segment beams and directing the segment beams in opposite direction; and
    second, third, fourth, and fifth condensing means for condensing the segment beams from the first and second separating means on the web sheet.

2. An apparatus according to claim 1, wherein each of said first and second separating means includes a pair of separating mirrors each having a trapezoidal reflective surface and movable along the reflective surface.

3. An apparatus according to claim 1, wherein said deflecting means includes a rotating polygon mirror for deflecting the laser beam within a predetermined range by rotating.

4. An apparatus according to claim 1, wherein said splitting/reflecting means has a pair of mirror surfaces adjoining each other at the vertex portion thereof.

5. An apparatus according to claim 1, further comprising means for transporting the web sheet at a fixed speed in a manner such that the sheet faces the second, third, fourth, and fifth condensing means, whereby the condensed segment beams from the second, third, fourth, and fifth condensing means form perforations in different linear regions of the web sheet.

* * * * *